July 20, 1954 — A. RATZLAFF — 2,684,021
SELF-LEVELING MECHANISM FOR FARM IMPLEMENTS
Filed Aug. 10, 1949 — 2 Sheets-Sheet 1
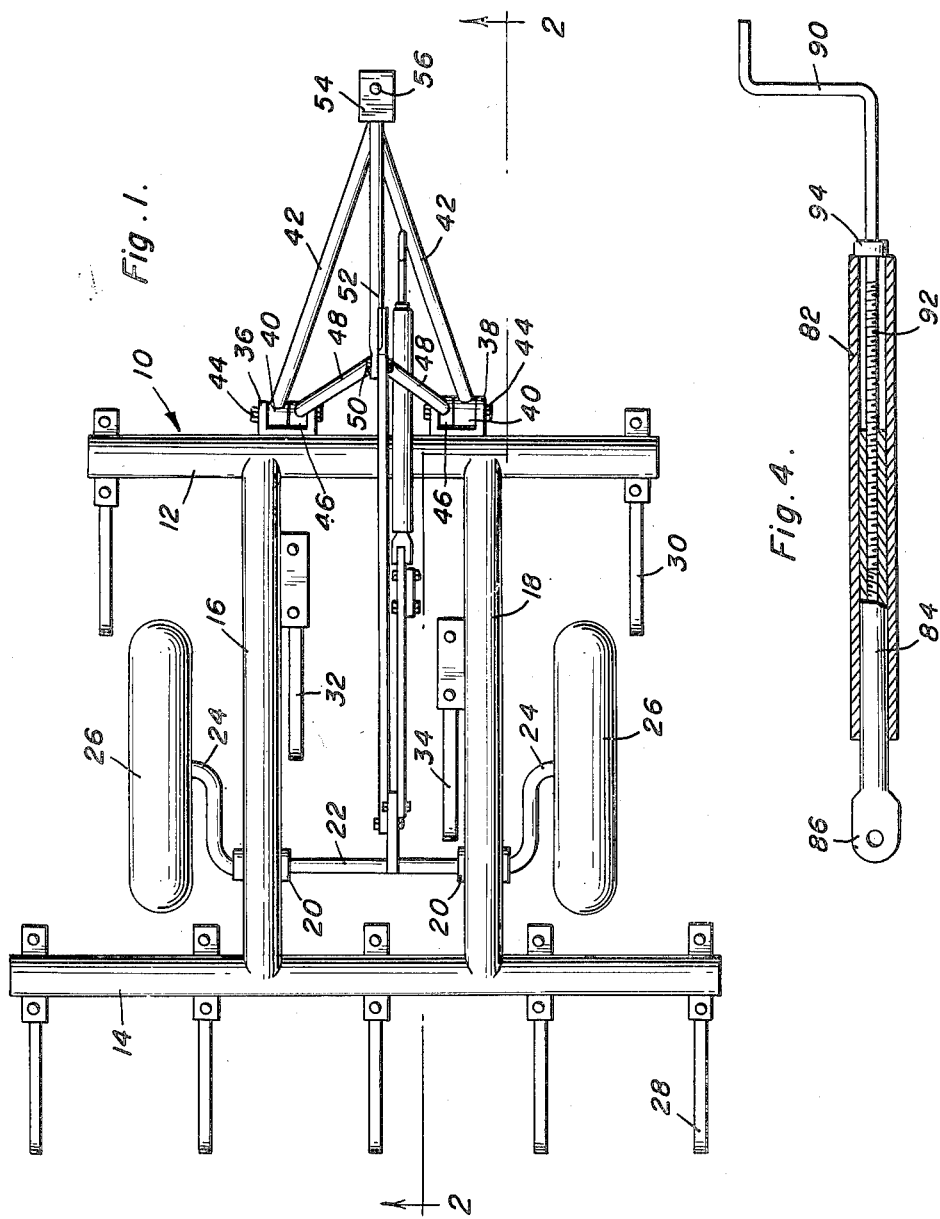
Alvin Ratzlaff
INVENTOR.

July 20, 1954     A. RATZLAFF     2,684,021
SELF-LEVELING MECHANISM FOR FARM IMPLEMENTS
Filed Aug. 10, 1949     2 Sheets-Sheet 2
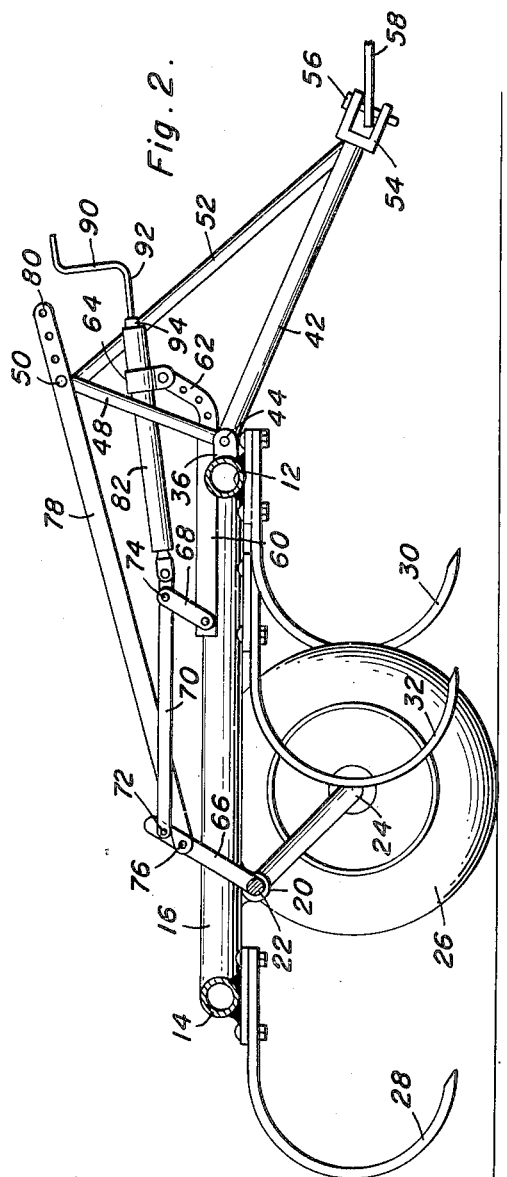
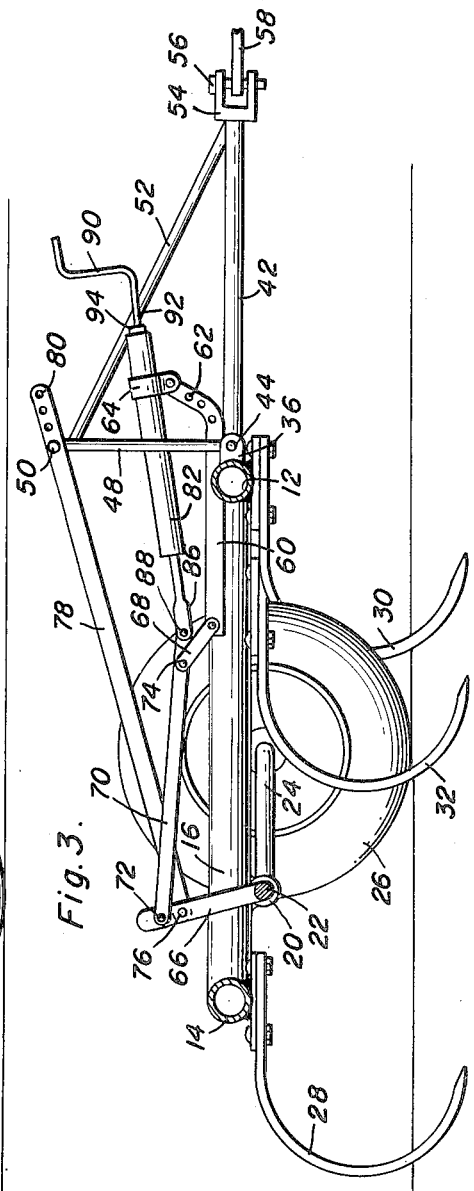
Alvin Ratzlaff
INVENTOR.

Patented July 20, 1954

2,684,021

UNITED STATES PATENT OFFICE 2,684,021

SELF-LEVELING MECHANISM FOR FARM IMPLEMENTS

Alvin Ratzlaff, Orienta, Okla.

Application August 10, 1949, Serial No. 109,557

6 Claims. (Cl. 97—47.25)

This invention relates to new and useful improvements in tractor drawn farm implements and the primary object of the present invention is to provide a tool supporting wheeled frame so constructed as to permit uniform penetration of all tools supported on the frame.

Another important object of the present invention is to provide a tool supporting frame, an axle journaled to the frame and having offset end portions supporting wheels, and a novel and improved mechanism for selectively rotating the axle to raise or lower the frame parallel to the ground so that all of the tools on the frame will penetrate the ground an equal amount.

A further object of the present invention is to provide a self-leveling mechanism for farm implements including a frame, an axle journaled on the frame and having offset end portions that support wheels and which are selectively moved toward and away from the frame upon rotation of the axle to raise or lower the frame, and a manually operated mechanism for moving and retaining the axle in a selected rotated position and the frame spaced parallel to the ground at a predetermined distance from the ground.

A still further object of the present invention is to provide a self-leveling mechanism for farm implements that is simple and practical in construction, strong and reliable in use, small and compact in structure, relatively inexpensive to manufacture, and otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a top plan view of the present invention;

Figure 2 is a longitudinal vertical sectional view taken substantially on the same plane section line 2—2 of Figure 1 and showing the frame raised;

Figure 3 is a view similar to Figure 2 and showing the frame lowered; and,

Figure 4 is an enlarged view, partially in section and partly on elevation, of the linkage actuator or jack used in conjunction with the present invention.

Referring now to the drawings in detail, wherein for the purpose of illustration, there is disclosed a preferred embodiment of the present invention, the numeral 10 represents a frame generally including spaced parallel forward and rear beams 12 and 14 that are connected by spaced parallel, longitudinally extending, beams 16 and 18. The beams, 12, 14, 16 and 18 are preferably tubular and the beams 16 and 18 support suitable bearings 20 for an axle 22.

The axle 22 is disposed parallel to and forwardly of the rear beam 14 and the axle 22 is provided with offset end portions 24 that support suitable ground engaging wheels 26.

A rear group of spaced parallel ground engaging members or teeth 28 are supported on and depend from the rear beam 14 and a forward group of spaced parallel ground engaging members or teeth 30 are supported on and depend from the forward beam 12. The beams 16 and 18 also support ground engaging members or teeth 32 and 34, respectively, and the tooth 34 trails the tooth 32 as shown in Figure 1. The teeth 30 are staggered with respect to the teeth 28 and the teeth 32 and 34 are staggered with respect to the teeth 28 and 30.

Heretofore, tractor-drawn two wheel cultivators have had rigid hitches, with some form of up or down adjustment at the clevis for the tractor drawbar. Such a construction is inefficient because as the depth adjustment varied, the front row of teeth on the machine responded less than the rear teeth, thus resulting in only fair quality work. It is therefore the primary object of the present invention to eliminate the foregoing difficulty and to provide a construction wherein all teeth will penetrate the ground an equal amount.

To accomplish the above desired features and objects, there is provided a pair of channel members or bearings 36 and 38 that are secured to the forward surface of the beam 12. The eye ends 40 of a pair of rearwardly diverging bars 42 are journaled on pivot pins 44 carried by the bearings 36 and 38. The pivot pins 44 also extend through the eye ends 46 of a pair of downwardly diverging bars 48. The upper ends of the bars 48 are joined by a pivot pin 50 that also extends through the rear end of a brace member 52. The forward ends of the bars 42 and member 52 converge and support a channel 54 holding a pin 56 that enters a suitable slot in a draw bar or hitch 58.

Suitably fixed to the central section of the beam 12 and disposed perpendicular to the beam 12 is a frame member or arm 60 having an upwardly curved apertured end portion 62 that receives a clamp 64.

An arm or link 66 is fixed to and projects from the central portion of the axle 22 and is joined to a further arm or link 68, pivoted on the frame member 69, by a pitman or connecting link 70 that is pivoted as at 72 and 74 to the arms 66 and 68.

Below the pivot pin 72 is a further pivot pin 76 joining the arm 66 to a further connecting bar or member 78. The forward end of the member 78 is provided with a plurality of longitudinally spaced openings 80 one of which receives the pivot pin 50.

The clamp 64 embraces and grips one end of sleeve 82 in which there is slidably mounted a rearwardly extending internally threaded tube 84 having a rear eye portion 86 that is pivoted by a pin 88 to the forward end of the bar 70. A crank handle 90 includes a threaded end 92 that receivably engages the tube 84 and a stop or abutment 94 on the end 92 contacts the forward end of the sleeve 82.

In practical use of the present invention, the draw bar 58 is attached to a tractor and the crank handle is rotated to move the tube 84 forwardly to rotate the axle clockwise as shown in Figure 2 whereupon the frame 10 will be raised parallel to the ground with the teeth 28, 30, 32 and 34 raised above the ground.

When the crank handle is rotated in one direction, the tube 84 will move rearwardly, and the links 66 and 68 will swing rearwardly to lower the frame parallel to the ground and the teeth 28, 30, 32 and 34 will penetrate the ground an equal amount as shown in Figure 3, also, the bars 42 will be raised to a horizontal position and the bars 48 will be raised to a vertical position.

The above operation is brought about since the distance between the pivot pin 72 and the axle 22 is to the distance between the axle 22 and the offset portion 24 as the distance between the pivot pin 50 and the pivot pins 44 is to the distance between the pivot pins 44 and the pin 56.

In view of the foregoing description taken in conjunction with the accompanying drawing it is believed that a clear understanding of the device will be quite apparent to those skilled in the art. A more detailed description is accordingly deemed unnecessary.

It is to be understood, however, that even though there is herein described a preferred embodiment of the invention, the same is susceptible to certain changes fully comprehended by the spirit of the invention as herein described and the scope of the appended claims.

Having described the invention, what is claimed as new is:

1. A self-leveling farm implement comprising a wheeled frame having a plurality of ground engaging members mounted thereon, an axle journaled on said frame, said axle having offset end portions, wheels on the offset end portions of said axle, a vertically swingable framework pivoted to said frame, a hitch bar carried by said framework, an arm secured to the axle, a connector between said framework and said arm, a further arm pivoted to the frame and spaced parallel to said first named arm, a connecting bar terminally pivoted to said arms, and means mounted on the frame and connected to said bar for moving the bar to rotate the axle and selectively raise and lower the frame relative to the ground.

2. The combination of claim 1 wherein said means includes a sleeve, a member slidably received in said sleeve and pivoted to said bar, said member having an internally threaded axial bore, and a threaded rod rotatably supported on said sleeve and threaded in said bore.

3. A farm implement comprising an elongated frame having forward and rear ends and forward and rear tool supporting beams, an axle on the rear end of the frame including offset end portions, wheels on said offset end portions, a link fixed to and projecting laterally from said axle, means pivotally mounted on the forward end of the frame and connected to the link for rotating the axle to selectively raise and lower said frame, a vertically swingable frame member also mounted on the forward end of said frame and including means for attaching the frame to a towing vehicle, and a pitman connecting said link to said frame member.

4. A farm implement comprising an elongated frame including forward and rear parallel tool supporting beams and longitudinal beams connecting the forward and rear beams, an axle rotatably supported by the longitudinal beams adjacent and parallel to the rear beam, said axle having offset end portions, wheels on said offset end portion, a link fixed to the axle, an arm fixed to said forward beam and paralleling the longitudinal beams, a forward link having one end pivoted to the arm, a pitman having a forward end pivoted to the other end of said forward link and a rear end pivoted to the first named link, means supported on said arm and connected to said pitman for adjusting the pitman longitudinally of the frame to rotate the axle in order to selectively raise and lower the frame, and a hitch frame vertically swingably mounted on said forward beam and adjustably connected to said axle supported link.

5. The combination of claim 4 wherein said means for adjusting the pitman comprises a sleeve overlying the arm, a clamp pivotally securing the sleeve to said arm, said sleeve having forward and rear ends, an internally threaded tube slidably received in the rear end of said sleeve and pivoted to said pitman, and a crank handle having a threaded end extend into the tube through the forward end of said sleeve for adjusting the tube longitudinally of said sleeve.

6. A farm implement comprising an elongated frame including forward and rear parallel tool supporting beams and longitudinal beams connecting the forward and rear beams, an axle rotatably supported by the longitudinal beams adjacent and parallel to the rear beam, said axle having offset end portions, wheels on said offset end portion, a link fixed to the axle, an arm fixed to said forward beam and paralleling the longitudinal beams, a forward link having one end pivoted to the arm, a pitman having a forward end pivoted to the other end of said forward link and a rear end pivoted to the first named link, means supported on said arm and connected to said pitman for adjusting the pitman longitudinally of the frame to rotate the axle in order to selectively raise and lower the frame, a pair of channel members fixed to said forward beam, a pair of rearwardly diverging bars having their rear ends pivoted to the channel members, a hitch channel fixed to the forward ends of said bars, a pair of downwardly diverging bars having lower ends pivoted to said channel members, a brace bar having a forward end fixed to the hitch channel and a rear end connected to the upper ends of said downwardly diverging bars, and a connecting bar having a rear end pivoted to the axle supported link and a forward end connected to the rear end of said brace bar.

References Cited in the file of this patent

UNITED STATES PATENTS

| Number | Name | Date |
|---|---|---|
| Re. 19,360 | Brodersen | Nov. 6, 1934 |
| 75,127 | Crowther | Mar. 3, 1868 |
| 1,347,926 | Andersen | July 27, 1920 |
| 1,570,782 | Scheving | Jan. 26, 1926 |
| 1,637,811 | Ferguson | Aug. 2, 1927 |
| 2,041,616 | Noell et al. | May 19, 1936 |
| 2,635,519 | Cook | Apr. 21, 1953 |